US012745257B2

(12) United States Patent
Xu et al.

(10) Patent No.: US 12,745,257 B2
(45) **Date of Patent: *Sep. 22, 2026**

(54) SYSTEMS AND METHODS TO PROVIDE CSI-RS/TRS INDICATION TO UES IN IDLE/INACTIVE MODE

(71) Applicant: Apple Inc., Cupertino, CA (US)

(72) Inventors: Fangli Xu, Beijing (CN); Yushu Zhang, Beijing (CN); Haitong Sun, Cupertino, CA (US); Sarma V. Vangala, Campbell, CA (US); Wei Zeng, Saratoga, CA (US); Dawei Zhang, Saratoga, CA (US); Yuchul Kim, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/761,044

(22) Filed: Jul. 1, 2024

(65) Prior Publication Data

US 2025/0063568 A1 Feb. 20, 2025

Related U.S. Application Data

(63) Continuation of application No. 17/593,748, filed as application No. PCT/CN2020/106132 on Jul. 31, 2020, now Pat. No. 12,028,870.

(51) Int. Cl.

| | |
|---|---|
| ***H04W 72/23*** | (2023.01) |
| ***H04L 5/00*** | (2006.01) |
| ***H04W 68/00*** | (2009.01) |

(52) U.S. Cl.

CPC .......... *H04W 72/23* (2023.01); *H04L 5/0048* (2013.01); *H04W 68/005* (2013.01)

(58) Field of Classification Search

CPC .............. H04W 72/23; H04W 68/005; H04W 56/001; H04W 48/02; H04L 5/0048; Y02D 30/70

See application file for complete search history.

(56) References Cited

U.S. PATENT DOCUMENTS

| | | | |
|---|---|---|---|
| 2019/0104005 | A1 | 4/2019 | Kim |
| 2019/0260447 | A1 | 8/2019 | Wooseok |

(Continued)

FOREIGN PATENT DOCUMENTS

| | | | |
|---|---|---|---|
| CN | 110226351 | A | 9/2019 |
| CN | 110475317 | A | 11/2019 |

(Continued)

*Primary Examiner* — Vinncelas Louis

(74) *Attorney, Agent, or Firm* — Blank Rome LLP

(57) ABSTRACT

An example method for wireless communication includes: transmitting by a base station, to a user device in a reduced power state, resource information for receiving a channel state information reference signal (CSI-RS) and tracking reference signal (TRS); transmitting the CSI-RS and TRS based on the transmitted resource information to the user device, wherein the user device has exited the reduced power state; determining whether there is paging information to transmit in a first physical downlink shared channel (PDSCH) transmission for the user device; transmitting a downlink control information message, wherein the downlink control information message is based on the determination that there is paging information for the user device, and wherein the user device has synchronized with the base station; and transmitting the first PDSCH transmission, based on the determination that there is paging information for the user device.

17 Claims, 12 Drawing Sheets

(56) References Cited

U.S. PATENT DOCUMENTS

| | | | | |
|---|---|---|---|---|
| 2019/0327663 | A1* | 10/2019 | Wirth | H04W 48/02 |
| 2020/0120636 | A1 | 4/2020 | Su | |
| 2020/0127711 | A1 | 4/2020 | Kim | |
| 2020/0127724 | A1 | 4/2020 | Kang | |
| 2020/0137602 | A1 | 4/2020 | Zhang | |
| 2021/0153162 | A1* | 5/2021 | Chen | H04W 56/001 |
| 2021/0288773 | A1 | 9/2021 | Lin | |

FOREIGN PATENT DOCUMENTS

| | | | |
|---|---|---|---|
| CN | 110690947 | A | 1/2020 |
| CN | 111148197 | A | 5/2020 |
| CN | 111200870 | A | 5/2020 |
| WO | 2019028849 | A1 | 2/2019 |

* cited by examiner 800
806
SSB
POs
808
810
812
814
816
818
UE POWER CONSUMPTION
804
802
TIME 900
CSI-RS/ TRS
POs
906
908
910
912
914
UE POWER CONSUMPTION
904
902
TIME

SYSTEMS AND METHODS TO PROVIDE CSI-RS/TRS INDICATION TO UES IN IDLE/INACTIVE MODE

FIELD

The present application relates to various apparatuses, systems, and methods to assist in providing Channel State Information-Reference Signal (CSI-RS)/Tracking Reference Signal (TRS) indications to mobile devices in a reduced power state, such as an idle or inactive state, in a cellular communication system to improve the performance of paging procedures.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to apparatuses, systems, and methods to assist cellular networks in providing CSI-RS/TRS indications to mobile devices in reduced power states, such as idle or inactive states, in a cellular communication system to improve the performance of paging procedures.

In particular, in 5G/NR, there is a need for a mechanism to provide improved User Equipment (UE) power performance in paging procedures, especially for UEs in reduced power states, such as the RRC_IDLE and/or RRC_INACTIVE states defined in 5G/NR. In mobile networks, when a UE does not have any ongoing data transmission over a certain period of time, it may enter into an RRC_IDLE or RRC_INACTIVE state (e.g., in the case of 5G/NR), in order to preserve battery life. If new data arrives for the device, the network may attempt to 'wake' the idle or inactive mobile device by sending so-called "paging" messages, to which the mobile device may respond accordingly. In 5G/NR, UEs relying on Synchronization Signal Blocks (SSBs) for preparation should wake up and monitor incoming SSBs, but, once waking up and synchronizing, a UE has to stay awake until its own particular Paging Occasion (PO) comes, which additional 'awake' time could increase the UE's power/energy consumption significantly.

Thus, according to some aspects disclosed herein, a method for paging in a wireless system is disclosed, the method comprising: transmitting by a base station, to a user device in a reduced power state, resource information for receiving a CSI-RS and TRS; transmitting the CSI-RS and TRS based on the transmitted resource information to the user device, wherein the user device has exited the reduced power state; determining whether there is paging information to transmit in a first PDSCH transmission for the user device; transmitting a downlink control information message, wherein the downlink control information message is based on the determination that there is paging information for the user device, and wherein the user device has synchronized with the base station; and transmitting the first PDSCH transmission, based on the determination that there is paging information for the user device.

In some aspects, the method may further comprise: transmitting, by the base station, a SIB to the user device (e.g., a device in a reduced power state), the SIB including the resource information for receiving the CSI-RS and TRS for a set of two or more user devices. In other aspects, the method may further comprise receiving, at the base station, a request from the user device for transmission of the SIB, e.g., via transmission of a random access channel (RACH) preamble. In some aspects, the resource information for receiving the CSI-RS and TRS may comprise predefined CSI-RS and TRS information (e.g., a configuration comprising a selection from among predefined sets of configuration information). In still other aspects, the base station may transmit a second PDSCH message to the user device prior to the first PDSCH message, the second PDSCH message including the resource information for receiving the CSI-RS and TRS. In yet other aspects, the base station may transmit a PDCCH message to the user device, the PDCCH message including the resource information for receiving the CSI-RS and TRS, wherein, e.g., the resource information included in the PDCCH message indicates a predefined CSI-RS and TRS pattern.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings, in which.

Figure 1:
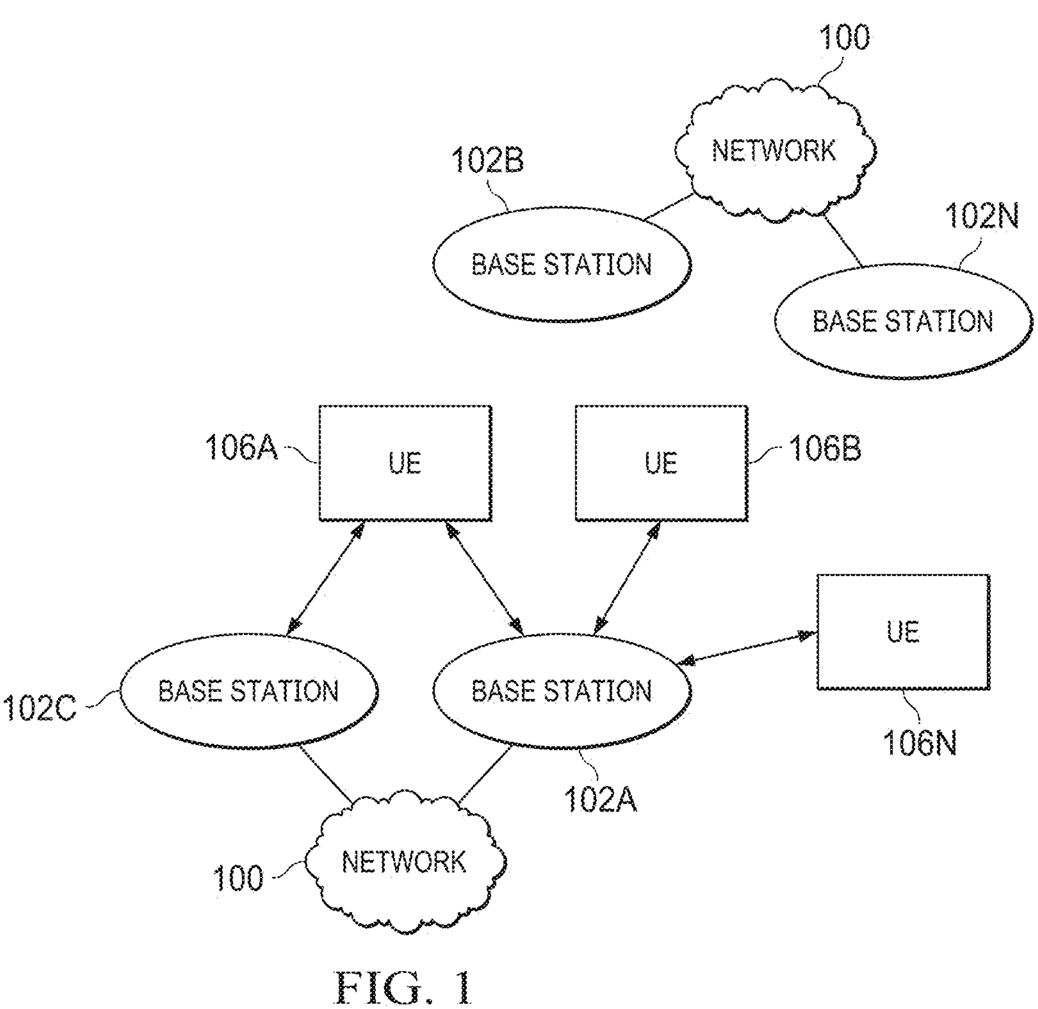
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or it may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "wireless node," "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system. For example, if the base station is implemented in the context of LTE, it may alternately be referred to as a "node," "eNodeB," or "eNB." If the base station is implemented in the context of 5G NR, it may alternately be referred to as a "node," "gNodeB," or "gNB."

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
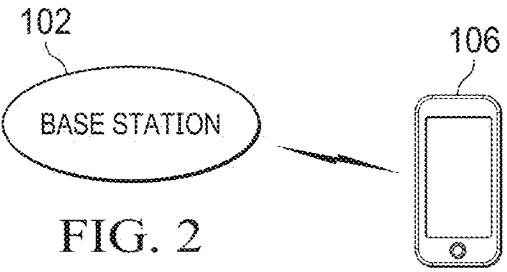
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
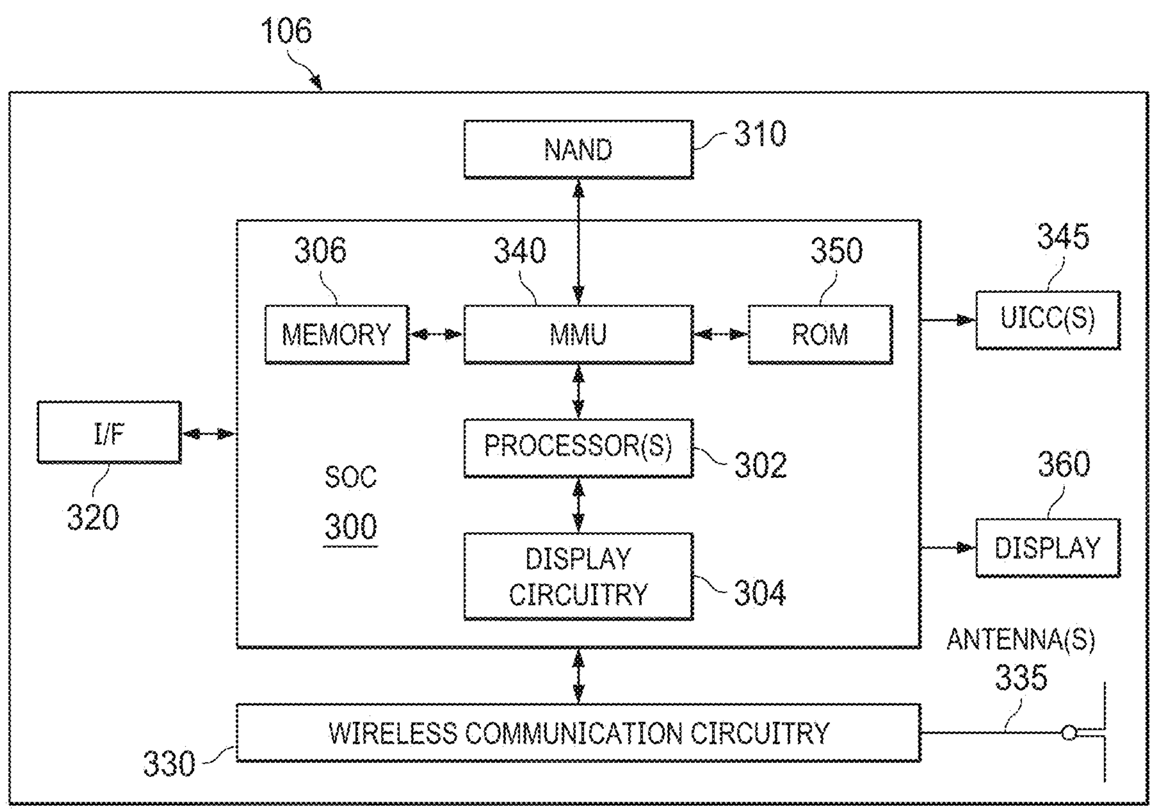
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
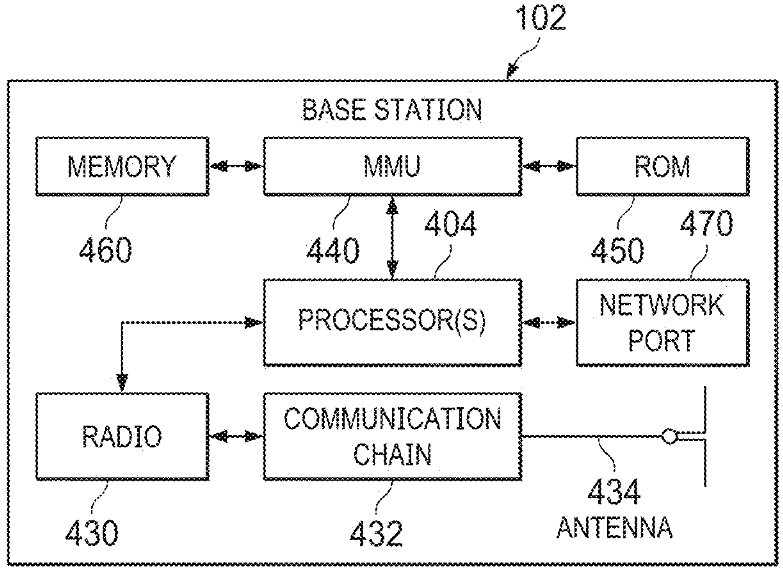
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
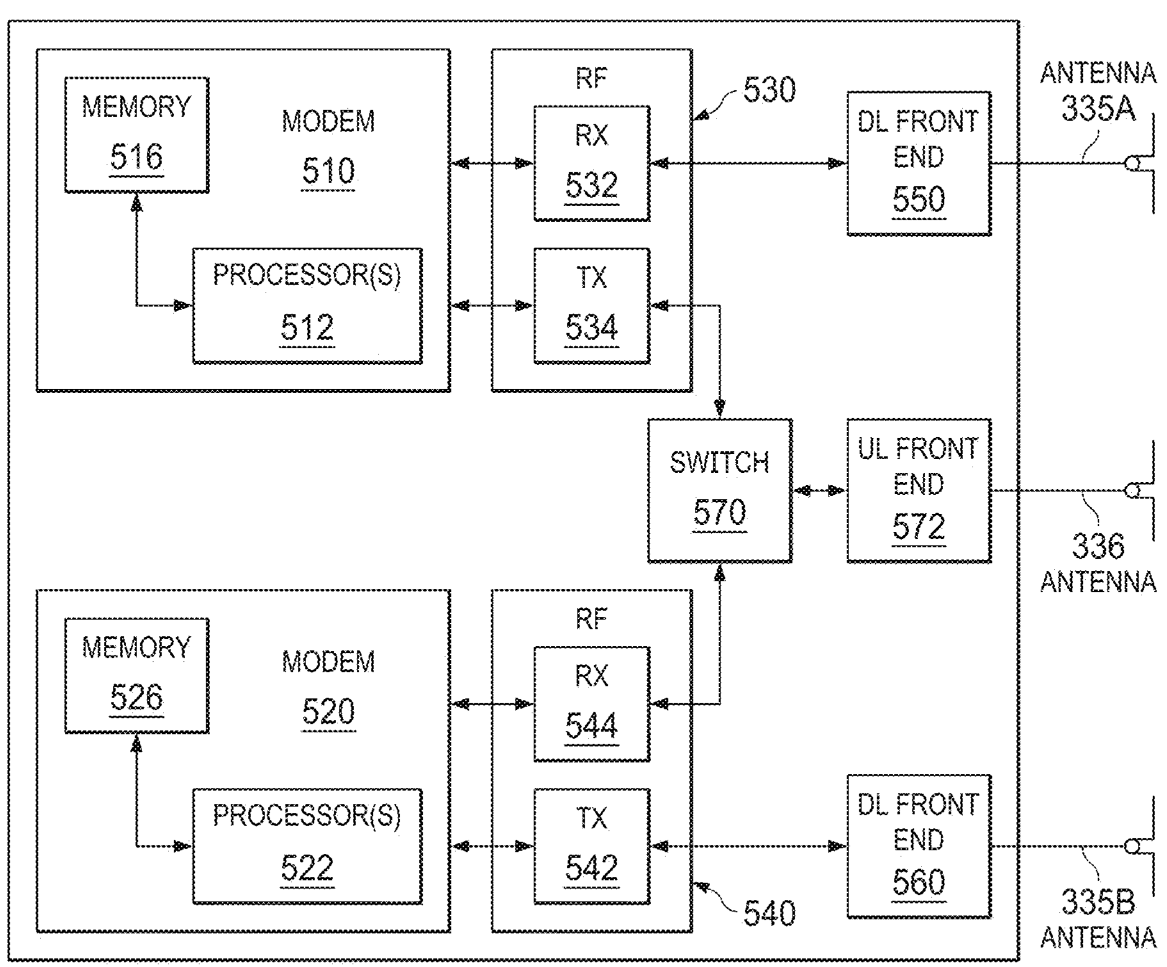
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335*b*.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some aspects, the cellular communication circuitry 330 may also not include the switch 570, and the RF front end 530 or the RF front end 540 may be in communication, e.g., directly, with the UL front end 572.

Example Network Element

Figure 6:
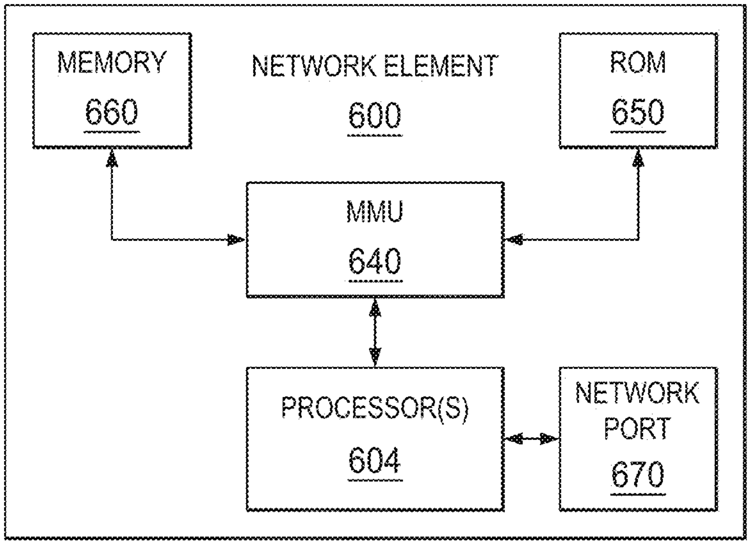
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Radio Resource Control (RRC) IDLE and INACTIVE States

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in an RRC_CONNECTED state (e.g., in which the wireless device can perform continuous data transfer, and in which handover between cells is managed by the network and access stratum (AS) context information is retained for the wireless device), or in an RRC_IDLE state (e.g., in which the wireless device may operate in a more battery efficient state when not performing continuous data transfer, in which the wireless device may handle its cell re-selection activities, and in which the network may not retain AS context information for the wireless device).

In addition to the RRC_CONNECTED and RRC_IDLE states, it may also be possible to support one or more other types of RRC states for a wireless device, at least according to some aspects. For example, for NR, an RRC_INACTIVE state, in which a wireless device may be able to operate in a relatively battery efficient state while the network also retains at least some AS context information, may be supported. In some aspects, the wireless device may maintain a non-access stratum connection (NAS) with the CN and RRC configuration, as it did before the UE entered the inactive state.

In certain cases, dedicated AS resources may not be allocated to the UE in the inactive state. At least according to some aspects, such a state may employ wireless device-based mobility, e.g., such that a wireless device can move within a radio access network notification area (RNA) without notifying the NG radio access network (RAN). While in this state, a wireless device may perform cell re-selection and system information acquisition for itself. At the same time, the last serving base station (e.g., gNB) may keep the wireless device context and the NG connection with the 5G core network (CN) associated with the wireless device, e.g., to facilitate easier transition back to an RRC_CONNECTED state. When paging a wireless device in RRC_INACTIVE state, RNA-specific parameters may be used by the RAN, for example including a UE-specific DRX and UE Identity Index value (e.g., I-RNTI).

A wireless device operating in such an RRC_INACTIVE state may perform RNA updates periodically (e.g., based on a configured periodic RNA update timer) and/or in an event-based manner, e.g., when the wireless device moves out of its current configured RNA to a different RNA, according to some aspects.

Use of an RRC_INACTIVE state may help reduce the network signaling overhead for a wireless device's connection, at least in some instances. For example, for a wireless device with infrequent data transmissions, utilizing such an RRC_INACTIVE state may reduce the amount of mobility related signaling (e.g., for handovers) needed compared to an RRC_CONNECTED state, e.g., since the wireless device may be able to manage its own cell re-selection process when moving between cells. For such a wireless device, utilizing an RRC_INACTIVE state may also reduce the amount of connection setup related signaling needed compared to an RRC_IDLE state, e.g., since the network may retain at least some context information for the wireless device. This may directly reduce the signaling latency associated with a transition to an RRC_CONNECTED state.

As another potential benefit, such a state may reduce the control plane delay for a wireless device, e.g., in comparison to operating in an RRC_IDLE state. For example, a reduced access stratum connection setup period and/or non-access stratum connection setup period may be possible for an RRC_INACTIVE state relative to an RRC_IDLE state. The time to move from a battery-efficient state to the start of continuous data transfer may thus be reduced.

Additionally, such a state may improve the power saving capability of a wireless device, e.g., in comparison to operating in an RRC_CONNECTED state. For example, while in RRC_CONNECTED state, serving and/or neighboring cell measurements may be required more frequently than while in an RRC_INACTIVE state, e.g., at least in line with a connected mode discontinuous reception (C-DRX) period of the wireless device.

The wireless device may manage cell re-selection while in an RRC_INACTIVE state. A goal of the cell re-selection process may include keeping a wireless device camped on a suitable cell, which may include a cell with sufficient signal strength, signal quality, and/or other characteristics such that the wireless device may be able to establish/activate a connection and perform data transfer via the cell. Cell re-selection may include either or both of intra-frequency cell re-selection or inter-frequency cell re-selection. As part of cell re-selection process while in such an RRC_INACTIVE state, a wireless device may perform cell measurements on serving and/or neighboring cells. The manner in which these cell measurements are performed can potentially have a substantial impact on wireless device power consumption and the amount of time needed to access continuous data transfer capability (e.g., by resuming operation in RRC_CONNECTED state). For example, if synchronization signal blocks (SSBs) are used to perform cell measurements, there may be a delay between a wireless device's inactive state wakeup instance and the next SSB burst, and/or measurements may be performed over a relatively long period of time to allow for receiver beam sweeping over multiple SSB bursts. Further, such SSB bursts may be performed at a different frequency and/or at a wider bandwidth than the wireless device's specified inactive state wakeup instance. Alternatively, a cellular base station could provide paging instances that are aligned with SSBs in time and/or frequency domains, e.g., to facilitate reduced wireless device power consumption in RRC inactive state.

Figure 7:
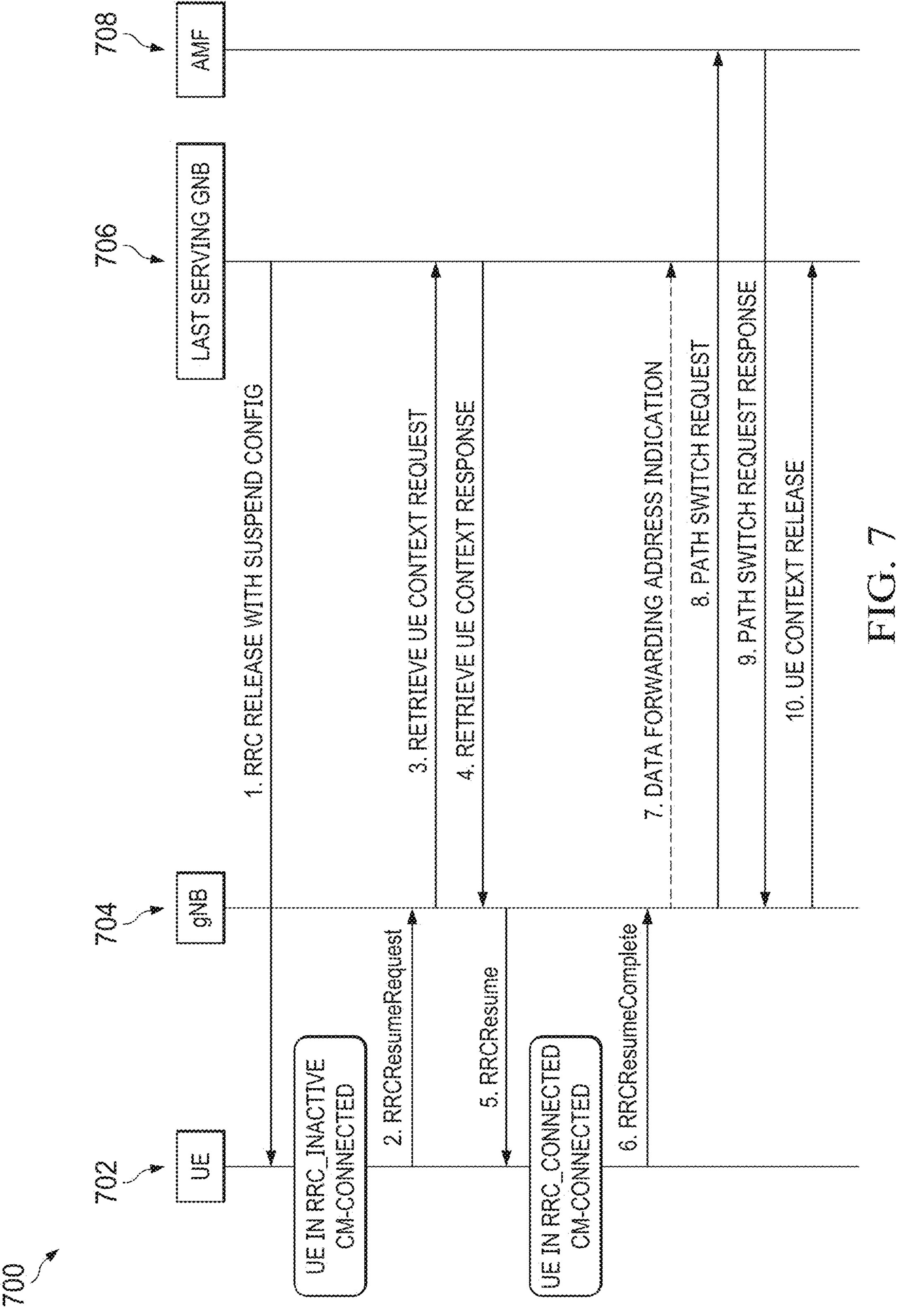
FIG. 7 illustrates an exemplary communications flow diagram of a communications flow for entering and resuming from an RRC_INACTIVE state.

Turning now to FIG. 7, a communications flow diagram illustrating a communications flow 700 for entering and resuming from an RRC_INACTIVE state is illustrated, in accordance with aspects of the present disclosure. Aspects of the communications flow may be implemented by a wireless device, e.g., in conjunction with a one or more wireless nodes and one or more portions of a core network (CN), such as a UE 702, gNB 704, last serving gNB 706, and Access and Mobility Functions (AMF) 708 illustrated in and described with respect to FIG. 7, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In the communications flow 700, the wireless node, such as UE 702, receives, for example, an RRC release message from a last serving gNB 706 (Step 1). The RRC release message may include suspend configuration information for entering the RRC inactive state by the UE 702. The suspend configuration information may include information for operating in and/or resuming the connection from the RRC inactive state, such as information about a RNA and security parameters for supporting an encrypted resume message, such as a UE identifier and resume security information. In some aspects disclosed herein, the gNB may also provide resource information for receiving a CSI-RS/TRS (as will be explained in further detail below) via the RRC release message with suspend configuration information. An RNA may comprise an area associated with a set of gNBs within which the UE is allowed to move without having to notify the network.

In certain cases, the UE 702 may want to perform a dedicated data transmission/reception which cannot be performed in the inactive state. To exit the inactive state, the UE 702 may initiate an RRC resume procedure by transmitting a RRC resume request to a gNB, in this example, gNB 704, which is a different gNB than the last serving gNB 706 (Step 2). The RRC resume request may include, for example, the UE identifier and resume security information. The gNB 704 may then retrieve a context for the UE 702 from the last serving gNB (Step 3). After receiving the UE context (Step 4), the gNB 704 may send the UE 702 a RRC resume message in response to the RRC resume request (Step 5). The UE 702 may then transition to an RRC connected state 710 and send a RRC resume complete message to the gNB 704 (Step 6).

The gNB 704 then performs a UE handover from the last serving gNB 706 by sending a data forwarding address indication to the last serving gNB (Step 7) and a path switch request to the AMF 708 (Step 8). The AMF 708 responds with a path switch request response (Step 9) and the gNB sends a UE context release to the last serving gNB 706 (Step 10).

In certain wireless communication networks, ciphering may be used to help provide data integrity and security. For example, in 5G NR, user data in data radio bearers (DRBs) blocks may be ciphered to provide data confidentiality and integrity protection for user data. Additionally, RRC signaling in signaling radio bearers (SRBs) blocks may be separately ciphered from user data to help provide signaling data confidentiality and wireless network integrity. Keys used for NAS level security between the CN and wireless devices are thus cryptographically separated from AS keys used in, for example, RRC signaling.

Improved Paging Procedures in 5G/NR

Paging procedures in 5G/NR allow UEs to camp on the system in reduced power states, such as the aforementioned RRC_IDLE or RRC_INACTIVE states. UEs are able to listen for paging messages while in the RRC_IDLE or RRC_INACTIVE states. Paging messages allow the network to initiate mobile-terminated connections. The CN is responsible for RRC_IDLE paging procedures, while a serving base station (e.g., a gNB) is responsible for the RRC_INACTIVE paging procedures. The paging message is the same for both CN-initiated paging (i.e., for UEs in RRC_IDLE state) and for RAN-initiated paging (i.e., for UEs in RRC_INACTIVE state). It is to be understood that, in some implementations, the techniques described herein may be applied similarly to both RRC_IDLE and RRC_INACITVE UEs, whereas, in other implementations, a network could choose to implement the techniques differently for UEs in different reduced power states (e.g., enabling a particular technique for use by UEs in the RRC_INACTIVE state but not enabling the particular technique for UEs in the RRC_IDLE state).

While UE-specific paging is available, e.g., to indicate the arrival of an incoming call, an additional category of paging information is also available when there is a need to notify all UEs in an RNA of a change to the System information or an incoming Earthquake and Tsunami Warning System (ETWS)/Commercial Mobile Alert Service (CMAS) message. In these cases, the paging procedure may use the payload of the PDCCH. Specifically, Downlink Control Information (DCI) Format 1_0 can include a "Short Message" when the Cyclic Redundancy Check (CRC) bits are scrambled using the Paging-Radio Network Temporary Identifier (P-RNTI). The Short Message may be used to indicate that the System Information has been updated and needs to be reacquired, or that there is an incoming ETWS/CMAS message.

For UEs in an RRC_IDLE state, the Access and Mobility Management Function (AMF) maintains a record of the UE's location and is used to perform the paging procedure for the UE. Specifically, the UE in RRC_IDLE (or RRC_INACTIVE) state is configured with a Discontinuous Reception (DRX) cycle, T (in terms of number of frames), for paging monitoring, i.e., the UE receiver enters a 'sleep' mode between periodic Paging Occasions (POs). The UE then determines its paging frame (PF) from among the T frames in the DRX cycle. Inside the PF, the UE determines a PO. The UE may determine its PO using a combination of information broadcast in System Information Block 1 (SIB1) and its allocated 5G SAE-Temporary Mobile Subscriber Identity (5G-S-TMSI). At each PO, the UE may scan for a PDCCH transmission that has its CRC scrambled by the P-RNTI to determine whether there is paging information in the PDSCH.

Inside the PO, there may be a number, S, of PDCCH monitoring occasions, where each of the S monitoring occasions corresponds to one Synchronization Signal Block (SSB). The UE may monitor all the PDCCH monitoring occasions transmitted through different beams to monitor for the paging message (with the assumption that the same paging message and short message are repeated in all transmitted beams or monitoring occasions).

As mentioned above, a UE may monitor DCI Format 1_0 with CRC bits scrambled using the P-RNTI. If DCI Format 1_0 is detected, the UE may read the Short Message indicator field. If the Short Message indicator indicates the existence of a paging message, the UE may decode the associated PDSCH (note that the UE-specific pagingRecordList is carried by the PDSCH). If a UE finds its UE_ID in the pagingRecordList, then the UE starts a Random Access Channel (RACH) procedure to make RRC connection (or reconnection). Otherwise, the UE may stay in its RRC_IDLE or RRC_INACTIVE state.

As mentioned above, for UEs that are in RRC_IDLE and/or RRC_INACTIVE modes, the UE enters a 'sleep' state for saving power between two consecutive POs. However, in order to receive paging messages, the UE has to wake up and perform preparations including, e.g., Automatic Gain Control (AGC), time/frequency offset estimation/adjustment, etc. These operations require obtaining a known signal from network, which is transmitted close to the UE's monitoring occasions. In LTE, there was Cell Reference Signal (CRS) transmitted every subframe and, thus, the UE was able to use the CRS for preparation. However, in 5G/NR there is no CRS. Thus, NR UEs use the SSB, which is transmitted periodically—but less often than every frame or subframe.

As may now be understood, NR UEs relying on the SSB for preparation need to wake up and monitor the SSB. However, because the SSB and POs are not aligned, the UE often has to wake up earlier than is necessary to receive the SSB. After performing AGC, time/frequency offset estimation/adjustment, etc., the UE then has to stay awake until its PO comes. This could increase the NR UE's power/energy consumption significantly, as described in more detail below and illustrated with reference to FIG. 8.

Figures 8, 9:
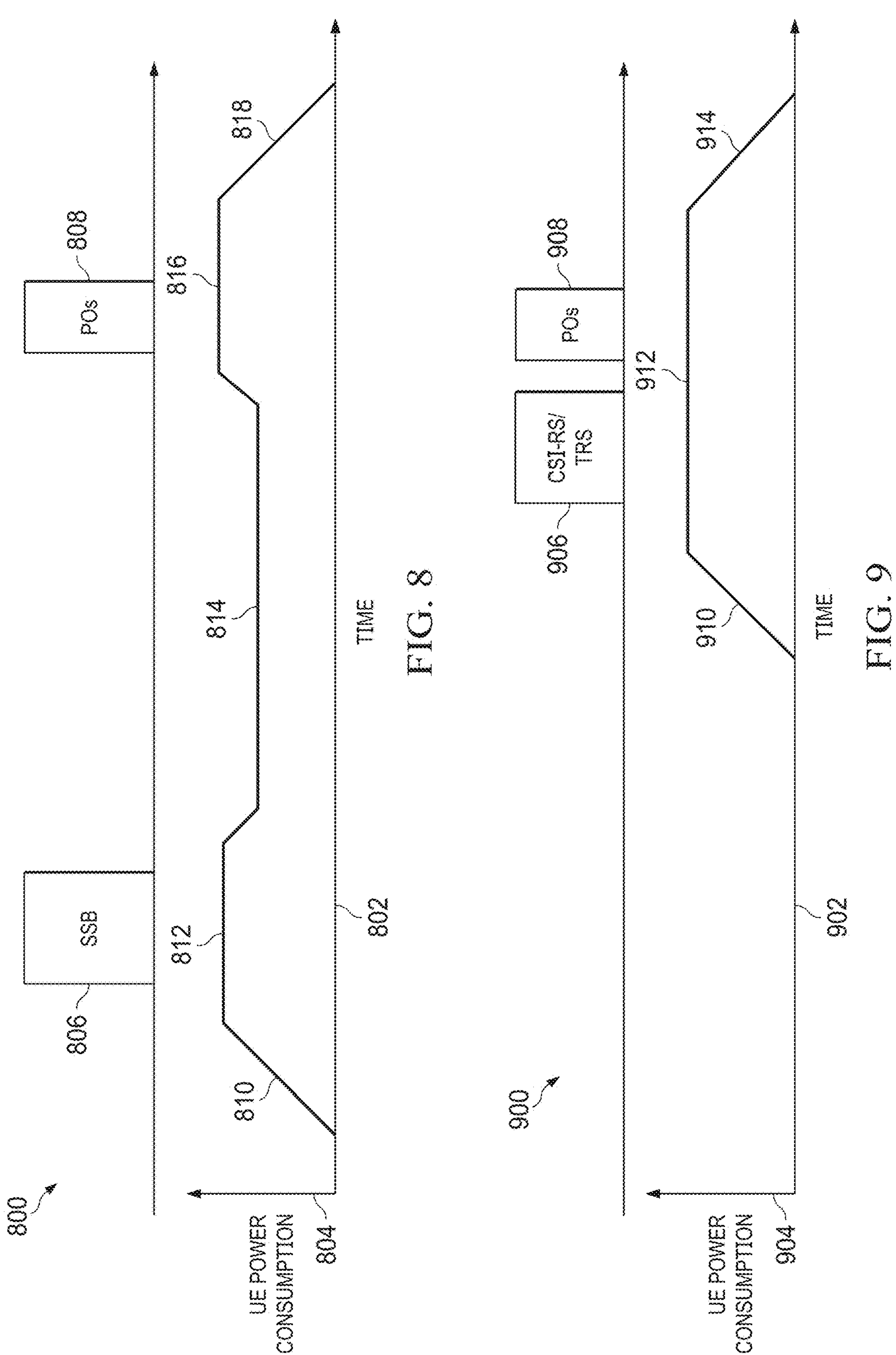
FIG. 8 illustrates an exemplary UE power consumption graph while awaiting a Paging Occasion (PO)
FIG. 9 illustrates an exemplary improved UE power consumption graph while awaiting a PO, according to some aspects.

Turning now to FIG. 8, an exemplary UE power consumption graph 800 is illustrated, showing the power consumption of a UE on vertical axis 804, plotted against time on horizontal axis 802, while the UE is awaiting a Paging Occasion (PO). As described above, the power consumption of the UE will begin to ramp up (810) to full power (812) in preparation for monitoring the SSB (806). Once the SSB has monitored, the UE may remain in an 'awake' state (814) while it waits for its next PO (808), it which point it may ramp back up to full power (816) to monitor the next PO (808) before it can return (818) to an idle or inactive state.

Turning now to FIG. 9, an exemplary improved UE power consumption graph 900 is illustrated, showing the power consumption of a UE on vertical axis 904, plotted against time on horizontal axis 902, while the UE is awaiting a Paging Occasion (PO). Typically, NR UEs in an RRC_CONNECTED state may be configured to receive CSI-RS/TRS information for channel tracking, time frequency synchronization, mobility, etc. However, such CSI-RS and TRS information can currently only be configured when a UE is in an RRC_CONNECTED state. CSI-RS or TRS configuration information is UE-specific configuration from the UE's perspective. However, from the network's perspective, multiple UEs could be configured with the same CSI-RS and TRS information to monitor the network. This shared configuration among CRS-RS and TRS could allow the network to reduce the resource overhead used for CSI-RS and TRS.

Advantageously, the CSI-RS and TRS could be even shared with UEs in the RRC_IDLE and/or RRC_INACTIVE states to help with the UEs' paging reception preparation. Specifically, if there is configured CSI-RS and TRS information transmitted close to a UE's PO, then the UE could use those CSI-RS/TRS readings for performing AGC, time/frequency synchronization, etc., to be synchronized and ready for its next PO.

Returning to FIG. 9, the power consumption of the UE will begin to ramp up (910) to full power (912) in preparation for monitoring the CSI-RS/TRS (906). Because the CSI-RS/TRS (906) is close in time to the UE's PO (908), the UE only needs to remain in an 'awake' state (912) for a shorter amount of time before it can return (914) to a reduced power (e.g., idle or inactive) state, thereby conserving UE power relative to the scenario illustrated in FIG. 8.

As alluded to above, UEs in RRC_IDLE and RRC_INACTIVE states do not have valid RRC configurations, which means any CSI-RS/TRS resource information received by a UE during a previous RRC_CONNECTED state is no longer valid when the UE is in an RRC_IDLE or RRC_INACTIVE state. Thus, it would be advantageous to provide a new mechanism for the network to use to notify UEs in RRC_IDLE and RRC_INACTIVE states which CSI-RS/TRS resource(s) to monitor.

In a first aspect, the new CSI-RS/TRS resource information for UEs in RRC_IDLE and RRC_INACTIVE states may be carried in a new type of SIB (also referred to herein as "SIB-x," to avoid confusion with any existing SIBs in NR). The new SIB-x could be periodically transmitted by the network to notify UEs in RRC_IDLE and RRC_INACTIVE states of available CSI-RS/TRS resource information using newly defined Information Elements (IEs), which will be described in greater detail below.

In 5G/NR implementations, the types of CSI-RS information that may be made available to UEs in an RRC_CONNECTED state include: Non-Zero Power (NZP) CSI-RS (TRS), which may be used, e.g., for CSI reporting, RLF, BM, mobility, and time/frequency tracking); CSI-Interference Measurement (CSI-IM), which may be used, e.g., for measuring interference from neighboring cells (during which nothing is transmitted from serving cell itself); and Zero Power (ZP) CSI-RS, which may be used, e.g., for reserving resources and performing rate matching.

In some implementations of the first aspect, the types of CSI-RS that may be also be used for UEs in a reduced power state, such as the RRC_INACTIVE or RRC_IDLE states include: the NZP CSI-RS (which could be used, if configured); and the TRS (which UEs are always configured for).

Information Elements or "IEs" in 5G/NR refer to parameters which may be set to a specified value. IEs should be introduced whenever there are multiple fields for which the same set of values apply. IEs may also be defined for other reasons, e.g., to break down a particular system element's definition into smaller pieces. A group of closely related IE type definitions may preferably be placed together, e.g., in a common ASN.1 section.

IEs related to CSI-RS for UEs in an RRC_CONNECTED state include: CSI-MeasConfig (which can include one or more CSI-ResourceConfig); CSI-ResourceConfig (which can include one or more of CSI-ResourceSet); NZP-CSI-RS-ResourceSet (which can include one or more of NZP-CSI-RS-Resource); and NZP-CSI-RS-Resource. According to some implementations of the first aspect (or other aspects disclosed herein), new IEs (and a new IE structure) may be introduced for UEs that are in a reduced power states, e.g., the RRC_IDLE or RRC_INACTIVE states. Such new IE structure, which may be referred to herein as an "NZP-CSI-ResourceConfig-IdleUE IE," may advantageously be based, at least in part, on existing IE structures for UEs in an RRC_CONNECTED state.

Figure 10:
FIG. 10 illustrates an exemplary NZP-CSI-ResourceConfig-IdleUE Information Element (IE) structure to be used for UEs in an RRC_IDLE or RRC_INACTIVE state, according to some aspects.
Figure 10:
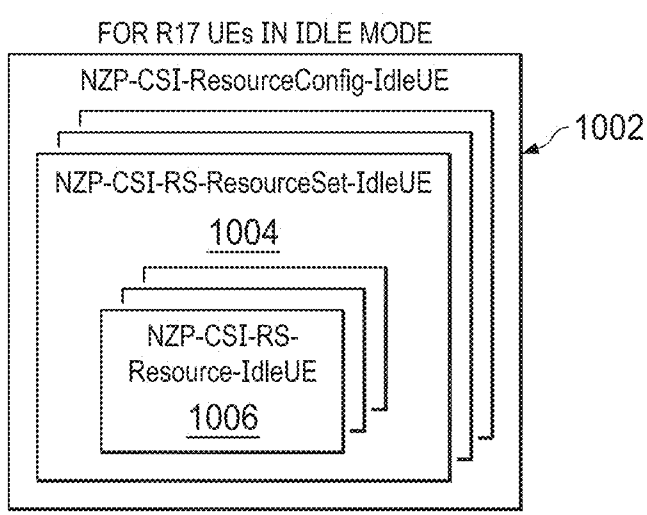

Turning now to FIG. 10, an exemplary NZP-CSI-ResourceConfig-IdleUE IE structure 1000 to be used for UEs in an RRC_IDLE or RRC_INACTIVE state is illustrated, according to some aspects. As illustrated in FIG. 10, in some implementations, the new IE structure may include the following new IEs: NZP-CSI-ResourceConfig-IdleUE 1002 (which can include a list of NZP-CSI-RS-ResourceSet-IdleUEs); NZP-CSI-RS-ResourceSet-IdleUE 1004 (which can include a list of NZP-CSI-RS-Resource-IdleUEs); and NZP-CSI-RS-Resource-IdleUE 1006 (which can indicate a CSI-RS resource).

As may now be understood, an NZP-CSI-RS-ResourceSet-IdleUE for RRC_INACTIVE/RRC_IDLE mode UEs corresponds to an NZP-CSI-RS-ResourceSet currently used by RRC_CONNECTED mode UEs, and an NZP-CSI-RS-Resource-IdleUE for RRC_INACTIVE/RRC_IDLE mode UEs corresponds to an NZP-CSI-RS-Resource currently used by RRC_CONNECTED mode UEs.

Figure 11:
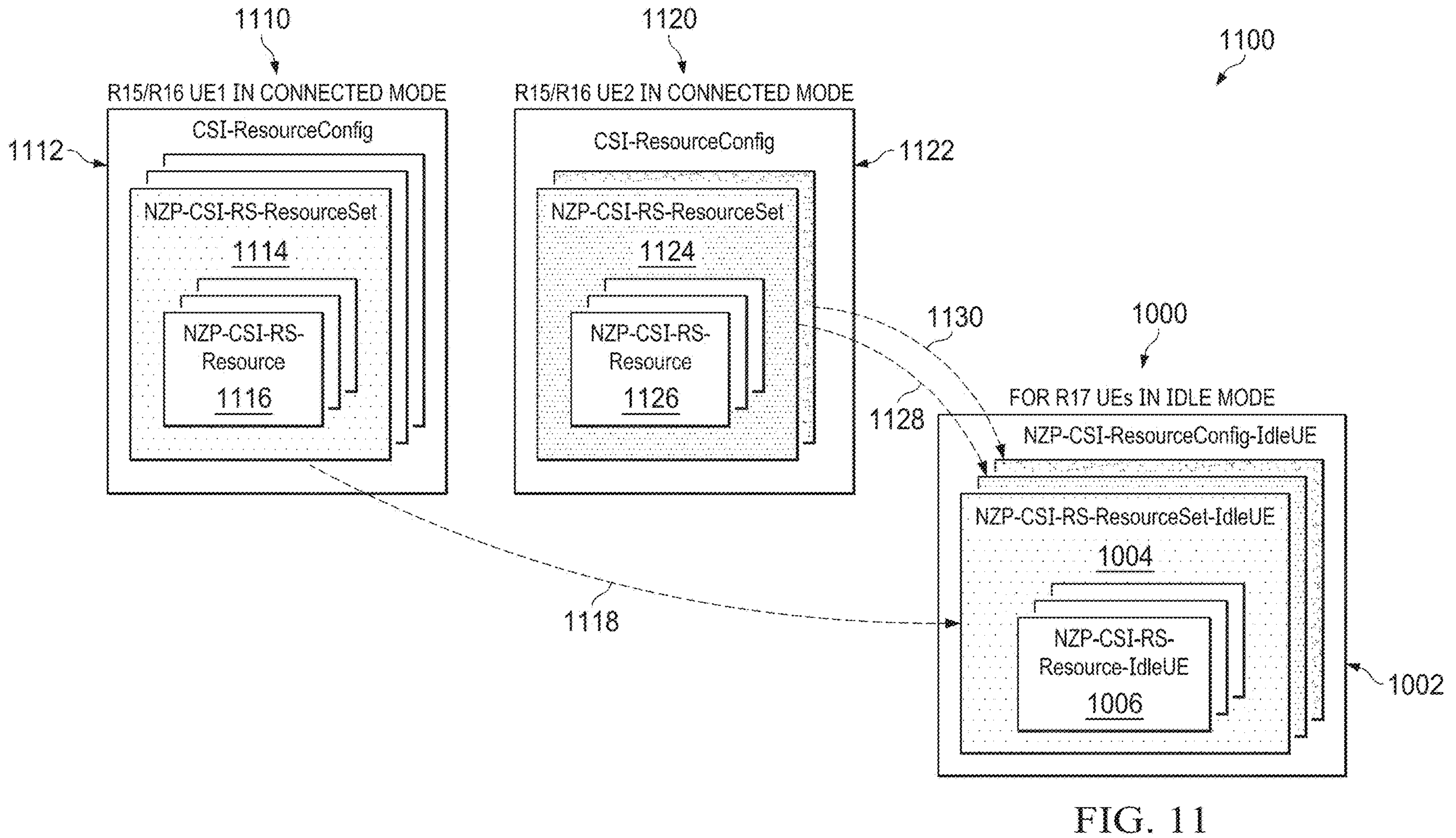
FIG. 11 illustrates an exemplary use of different NZP-CSI-ResourceConfig-IdleUE IEs for UEs in an RRC_IDLE or RRC_INACTIVE state, which correspond to different NZP-CSI-RS-ResourceSets from different UEs in RRC_CONNECTED mode, according to some aspects.

Turning now to FIG. 11, an exemplary use of different NZP-CSI-ResourceConfig-IdleUE IEs for UEs in an RRC_IDLE or RRC_INACTIVE state, which correspond to different NZP-CSI-RS-ResourceSets from different UEs in RRC_CONNECTED mode, is illustrated 1100, according to some aspects. Element 1110 in FIG. 11 refers to an R15/R16 UE (referred to in this example as "UE1") in an RRC_CONNECTED mode, and element 1120 refers to another R15/R16 UE (referred to in this example as "UE2") in an RRC_CONNECTED mode. Element 1110 is defined by a CSI-ResourceConfig (1112), which contains a list of NZP-CSI-RS-ResourceSets (1114), each of which may also contain a list of NZP-CSI-RS-Resources (1116). Likewise, element 1120 is defined by a CSI-ResourceConfig (1122), which contains a list of NZP-CSI-RS-ResourceSets (1124), each of which may also contain a list of NZP-CSI-RS-Resources (1126).

As illustrated by arrow 1118 in FIG. 11, the NZP-CSI-RS-ResourceSet 1114 from UE1 (1110) may be stored as an NZP-CSI-RS-ResourceSet-IdleUE 1004 (which, as mentioned above, can include a list of NZP-CSI-RS-Resource-IdleUEs 1006). Likewise, as illustrated by arrows 1128 and 1130 in FIG. 11, NZP-CSI-RS-ResourceSets 1124 from UE2 (1120) may be stored as additional NZP-CSI-RS-ResourceSet-IdleUE IEs 1004 in exemplary NZP-CSI-ResourceConfig-IdleUE IE structure 1000 that is to be used for UEs (e.g., Rel-17 or later UEs) in an RRC_IDLE or RRC_INACTIVE state.

Now, discussion will turn to various parameters that could be included in the NZP-CSI-ResourceConfig-IdleUE, the NZP-CSI-RS-ResourceSet-IdleUE, and the NZP-CSI-RS-Resource-IdleUE IEs.

First, the NZP-CSI-ResourceConfig-IdleUE IE may comprise an nzp-CSI-RS-ResourceSets parameter. This parameter could include a list of CSI-RS-ResourceSet-IdleUEs. Including multiple NZP-CSI-RS-ResourceSet IEs should be compatible with current NR schemes, since NZP-CSI-RS-ResourceSet IE can have only one periodicity. Different RRC_IDLE mode UEs could have different DRX cycles and offsets, thus, to help them to find one CSI-RS that is close in time to their own PO, multiple CSI-RS-Resource Sets should be able to be indicated.

Second, the NZP-CSI-RS-ResourceSet-IdleUE IE may comprise the following parameters: nzp-CSI-RS-Resources-Set-IdleUE-ID (i.e., the ID of a resource set); nzp-CSI-RS-Resources-IdleUE (i.e., one or more of non-zero power CSI-RS resource); repetition (i.e., an indication of whether the same spatial filter is used for the transmission of CSI-RS in CSI-RS-Resource(s) in the CSI-RS-ResourceSet; the value of this parameter may be the same as the one in the corresponding NZP-CSI-RS-ResourceSet for UEs in an RRC_CONNECTED mode); and TRS-info (a field that may be set to 'TRUE' if the NZP-CSI-RS is for TRS).

Third, the NZP-CSI-RS-Resource-IdleUE IE may comprise the following parameters (which are a subset of the parameters of the existing NZP-CSI-RS-Resource structure): nzp-CSI-RS-ResourceID (i.e., an ID of CSI-RS resource); resourceMapping (i.e., a field that specifies the time/frequency mapping of CSI-RS to resource elements); powerControlOffset (i.e., a field that specifies the power difference between CSI-RS and PDSCH); powerControlOffsetSS (i.e., a field that specifies the power difference between CSI-RS and Secondary Synchronization Signal (SS)); scramblingID (i.e., an input for generating pseudo random sequences); periodicityAndOffset (i.e., specifying the periodicity and offset of the CSI-RS); and qcl-InfoPeriodicCSI-RS (i.e., specifying quasi co-location (QCL) information of CSI-RS). (In NR, two antenna ports are said to be "quasi co-located" if properties of the channel over which a symbol on one antenna port is conveyed can be inferred from the channel over which a symbol on the other antenna port is conveyed.)

Regarding QCL indication for RRC_IDLE mode UEs (e.g., using the qcl-InfoPeriodicCSI-RS IE), it is noted that an RRC_IDLE mode UE has no Transmission Configuration Indicator (TCI) states. Thus, interpretation of qcl-InfoPeriodicCSI-RS cannot be the same for an RRC_IDLE mode UE as it is for a UE in an RRC_CONNECTED state. The qcl-InfoPeriodicCSI-RS parameter of original CSI-RS resource of UE(s) in an RRC_CONNECTED mode could instead be used to refer (e.g., by being QCLed) to either other CSI-RS resource configured for the UEs in an RRC_CONNECTED mode or to the SSB. The qcl-InfoPeriodicCSI-RS for RRC_IDLE mode UEs thus cannot not be QCLed with other CSI-RS, since the QCLed CSI-RS information is available only for the UE(s) in an RRC_CONNECTED mode. However, having qcl-InfoPeriodicCSI-RS QCLed with the SSB is permissible, since RRC_IDLE mode UEs know the correct SSB locations and receiving beams to use. This suggests that only the CSI-RS Resources for UEs in an RRC_CONNECTED mode that are QCLed with the SSB could be used for UEs in the RRC_IDLE mode. Thus, according to some implementations of the first aspects (and other aspects disclosed herein), the CSI-RS Resource indication for RRC_IDLE mode UEs includes QCL information for SSB only.

Figures 12, 13:
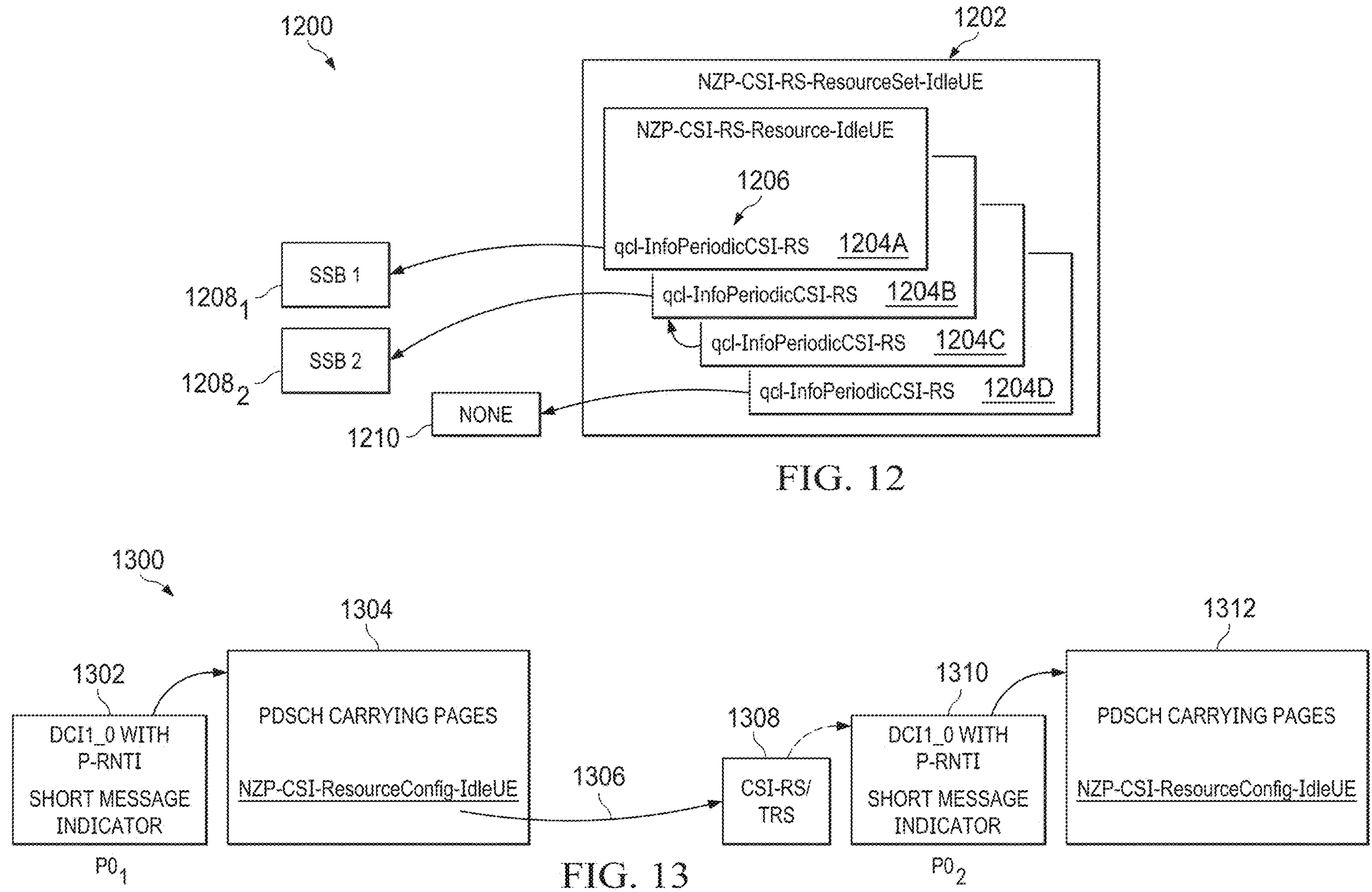
FIG. 12 illustrates additional approaches to performing QCL indication for UEs in an RRC_IDLE or RRC_INACTIVE mode, according to some aspects.
FIG. 13 illustrates an approach to using PDSCH to carry CSI-RS/TRS resource information, according to some aspects.

Turning now to FIG. 12, additional approaches 1200 to performing QCL indication for UEs in an RRC_IDLE or RRC_INACTIVE mode are illustrated, according to some aspects. FIG. 12 illustrates an exemplary NZP-CSI-RS-ResourceSet-IdleUE structure (1202), which contains a list of NZP-CSI-RS-Resource-IdleUE structures (1204A-1204D), each of which may contain an qcl-InfoPeriodicCSI-RS IE 1206. According to some approaches for QCL indication (i.e., using the qcl-InfoPeriodicCSI-RS IE 1206), the CSI-RS Resource used by an RRC_CONNECTED mode UE may be included when they are QCLed with: (1) the SSB (e.g., as shown between SSB1 (12081) and NZP-CSI-RS-Resource-IdleUE 1204A or between SSB2 (12082) and NZP-CSI-RS-Resource-IdleUE 1204B); (2) one of CSI-RS Resources indicated for the RRC_IDLE mode UE (e.g., as shown between NZP-CSI-RS-Resource-IdleUE 1204B and NZP-CSI-RS-Resource-IdleUE 1204C; or (3) none, meaning that the qcl-InfoPeriodicCSI-RS IE field is not included in NZP-CSI-RS-Resource-IdleUE (as shown in 1210).

As mentioned above, there is preferably some form of message delivery mechanism for RRC_IDLE and RRC_INACTIVE mode UEs. In particular, UEs in RRC_IDLE or RRC_INACTIVE mode may need to receive system information (SI) to acquire the parameters necessary for cell (re) selection and paging reception. Currently, there are nine SIBs defined in NR (i.e., SIB1 through SIB9), which are carried by system information RRC messages. Thus, according to various implementations proposed herein, a new SIB (also referred to herein as "SIB-x") may be used for indicating CSI-RS resource Sets for RRC_IDLE and RRC_INACTIVE mode UEs. As described in detail above, the aforementioned SIB-x may include an NZP-CSI-ResourceConfig-IdleUE IE to support the notification of CSI-RS resource sets available to RRC_IDLE and RRC_INACTIVE mode UEs.

Various approaches are available for the SIB transmission mechanism in such schemes. For example, in one implementation, the new SIB-x may be transmitted periodically (wherein, e.g., SIB1 may be used to indicate the periodicity of the transmission of the new SIB-x). Alternately, in another implementation the new SIB-x may be transmitted 'on-demand.' For example, a UE could send its assigned preamble to the network to request SIB-x transmission. The SIB1 could be used to indicate which RACH configuration could be used. (For example, in the RACH process, either MGS1 or MSG3 could be used as the request for the transmission of the new SIB-x to the UE).

In a second aspect, the SIB-x may be configured to carry one of a predefined set of CSI-RS/TRS resource information configurations. This approach may have the benefit of reducing signaling overhead, since the TRS resource indication could be selected from among predefined TRS resource configurations only. For example, there could be N (e.g., where N=16) sets of possible configurations predefined, which may include some (or all) of the following elements: (1) the periodicity of TRS; (2) the slot offset of TRS; (3) the starting symbol index of TRS; (4) the bandwidth of TRS (if this parameter was not indicated, the TRS could take the whole bandwidth; and (5) the comb offset of TRS.

According to the second aspect, in the SIB, $\log_2(N)$ bits could be used to indicate the TRS configuration. The QCL for the TRS may be the same as its corresponding SIB (or corresponding SSB), and the TRS sequence may be generated based on cell ID or other ID value explicitly indicated. As an alternative delivery mechanism for carrying the predefined TRS resource information, instead of the SIB, the PDSCH carrying the paging message could itself be used to carry the Medium Access Control (MAC) Control Element (CE), which can enable or disable TRS, depending on the needs of the system.

In a third aspect, the PDSCH carrying the paging messages could also be used to carry CSI-RS/TRS resource information, which could potentially be used for UEs monitoring the same POs in upcoming PFs. In particular, the PDSCH carrying paging messages could be used for carrying NZP-CSI-ResourceConfig-IdleUE structures, as described above. The PDSCH allocation is flexible, thus its size could be increased as needed to carry CSI-RS/TRS resource information, as well. In some cases, only the relevant CSI-RS/TRS resource information (e.g., those that are close in time to the PO) are actually included in the PDSCH. Another potential benefit of this third aspect is that different UE, with different POs, would be able to see different NZP-CSI-Resource-IdleUEs. Thus, according to the third aspect, an NZP-CSI-ResourceConfig for RRC_IDLE mode UEs may be included in the PDSCH carrying paging message.

In a fourth aspect, the PDCCH may also or alternatively be used to carry the CSI-RS/TRS resource information, e.g., with P-RNTI information, which could potentially be used for UEs monitoring the same POs in upcoming PFs. This fourth aspect is similar to the third aspect described above, but the CSI-RS/TRS information for paging message scheduling may be carried directly in the PDCCH, rather than the PDSCH. In some implementations of the fourth aspect, the information carried in the PDCCH with P-RNTI could be the index of the predefined CSI-RS/TRS pattern or the index of the patterns provided in the SIB. Examples of patterns, in this context, could refer to the periodicity and/or frequency spread of the CSI-RS/TRS.

Turning now to FIG. 13, an approach 1300 to using PDSCH to carry CSI-RS/TRS resource information is illustrated, according to some aspects. At block 1302, a UE may monitor DCI Format 1_0 with CRC bits scrambled using the P-RNTI at a first PO (labeled as $PO_1$). If DCI Format 1_0 is detected, the UE may read the Short Message indicator field. If the Short Message indicator indicates the existence of a paging message, at block 1304, the UE may decode the associated PDSCH and obtain an NZP-CSI-ResourceConfig-IdleUE. As discussed above, the NZP-CSI-ResourceConfig-IdleUE may be used to convey one or more sets of CSI-RS/TRS resource information to UEs in RRC_IDLE mode.

The CSI-RS/TRS information obtained by the UE (represented at block 1308) could then be used for synchronization and paging reception in the next PO (the passage of time represented by arrow 1306, and the next PO labeled as $PO_2$ at block 1310). Finally, at block 1312, the UE could obtain its actual paging message from the PDSCH. As mentioned above, different UE, with different POs, would be able to see different NZP-CSI-Resource-IdleUEs.

It is to be understood that one or more of the first through fourth aspects described above could be combined in a given implementation, and the various aspects are not necessarily mutually exclusive with one another. For example, some networks may adopt new predefined configurations over time and/or allow for the customization or setting of modes used to transmit CSI-RS/TRS resource information to RRC_IDLE or RRC_INACTIVE mode UEs.

It is also to be understood that, according to each of the first through fourth aspects described above, a UE can perform measurements on the CSI-RS/TRS and then take the measurements (e.g., Reference Signal Received Power (RSRP)/Reference Signal Received Quality (RSRQ) measurements) into account for cell quality evaluation, i.e., for cell selection and/or re-selection purposes.

Figure 14:
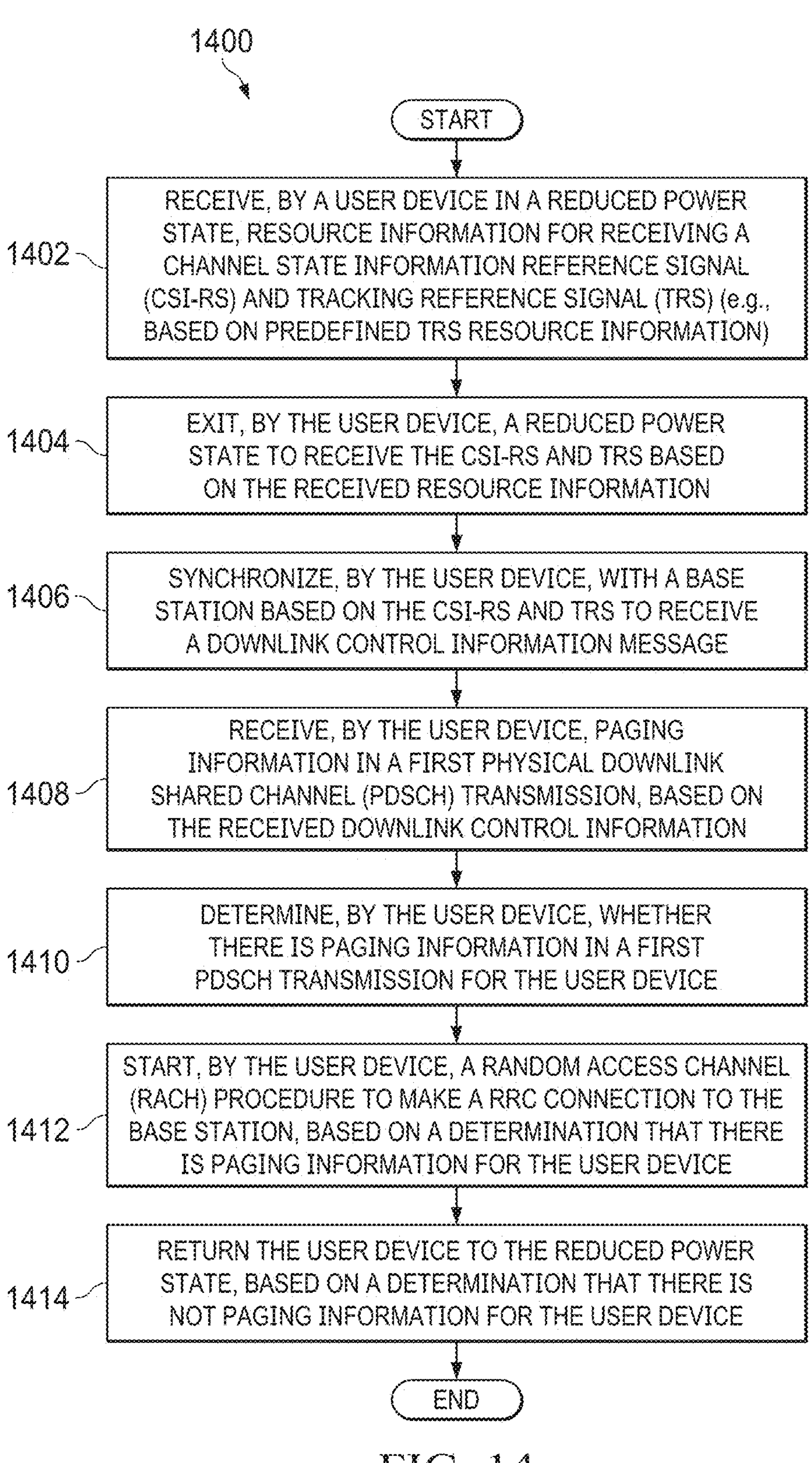
FIG. 14 illustrates an exemplary flow chart for receiving CSI-RS and TRS resource information by a UE in a reduced power state, such as the RRC_IDLE or RRC_INACTIVE modes, according to some aspects.

Turning now to FIG. 14, an exemplary flow chart 1400 for receiving CSI-RS and TRS resource information by a UE in a reduced power state, such as the RRC_IDLE or RRC_INACTIVE modes is illustrated, according to some aspects. First, at Step 1402, the method may receive, by a user device (e.g., a 5G/NR UE) in a reduced power state, resource information for receiving a channel state information reference signal (CSI-RS) and tracking reference signal (TRS) (e.g., based on predefined TRS resource information, as described above with reference to the second aspect). Next, at Step 1404, the user device may exit a reduced power state (e.g., an RRC_INACTIVE or RRC_IDLE state) to receive the CSI-RS and TRS based on the received resource information. Next, at Step 1406, the user device may synchronize with a base station, based on the CSI-RS and TRS to receive a downlink control information message. Next, at Step 1408, the user device may receive paging information in a first PDSCH transmission based on the received downlink control information message. Next, at Step 1410, the user device may determine whether there is paging information in the first PDSCH transmission for the user device. Next, at Step 1412, the user device may start a RACH procedure to make a RRC connection to the base station, based on a determination that there is paging information for the user device, or, at Step 1414, return to the reduced power state, based on a determination that there is not paging information for the user device.

Figure 15:
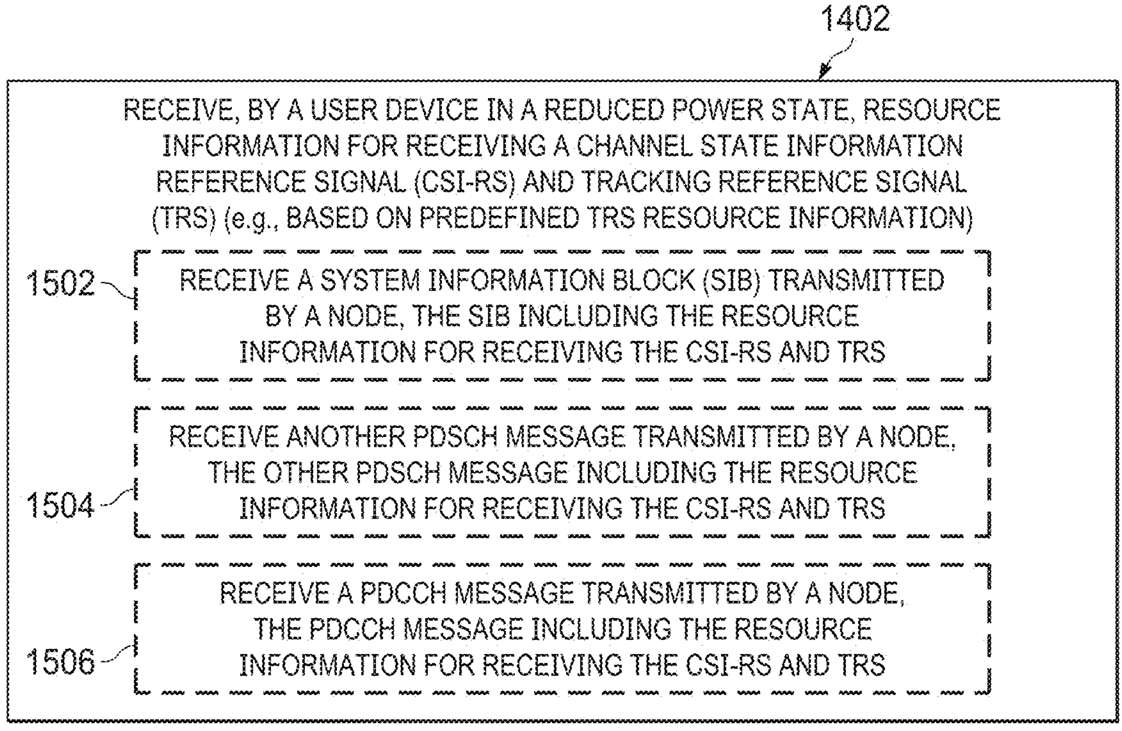
FIG. 15 illustrates an exemplary flow chart for various ways for a user device to receive CSI-RS and TRS resource information while in a reduced power state, such as the RRC_IDLE or RRC_INACTIVE modes, according to some aspects.

Turning now to FIG. 15, an exemplary flow chart for various ways for a user device to receive the CSI-RS and TRS resource information of Step 1402 while in a reduced power state, such as the RRC_IDLE or RRC_INACTIVE modes is illustrated, according to some aspects. At block 1502, an option is presented for a user device to receive a SIB transmitted by a base station, the SIB including the resource information for receiving the CSI-RS and TRS. At block 1504, another option is presented for a user device to receive another PDSCH message (e.g., a PDSCH message transmitted prior to the PDSCH message referenced in Step 1408) transmitted by a base station, the other PDSCH message including the resource information for receiving the CSI-RS and TRS. At block 1506, yet another option is presented for a user device to receive a PDCCH message transmitted by a base station, the PDCCH message including the resource information for receiving the CSI-RS and TRS. As may be understood, one or more of the various options described with reference to FIG. 15 may be used in a given wireless communication system at different times and/or according to different settings.

Figure 16:
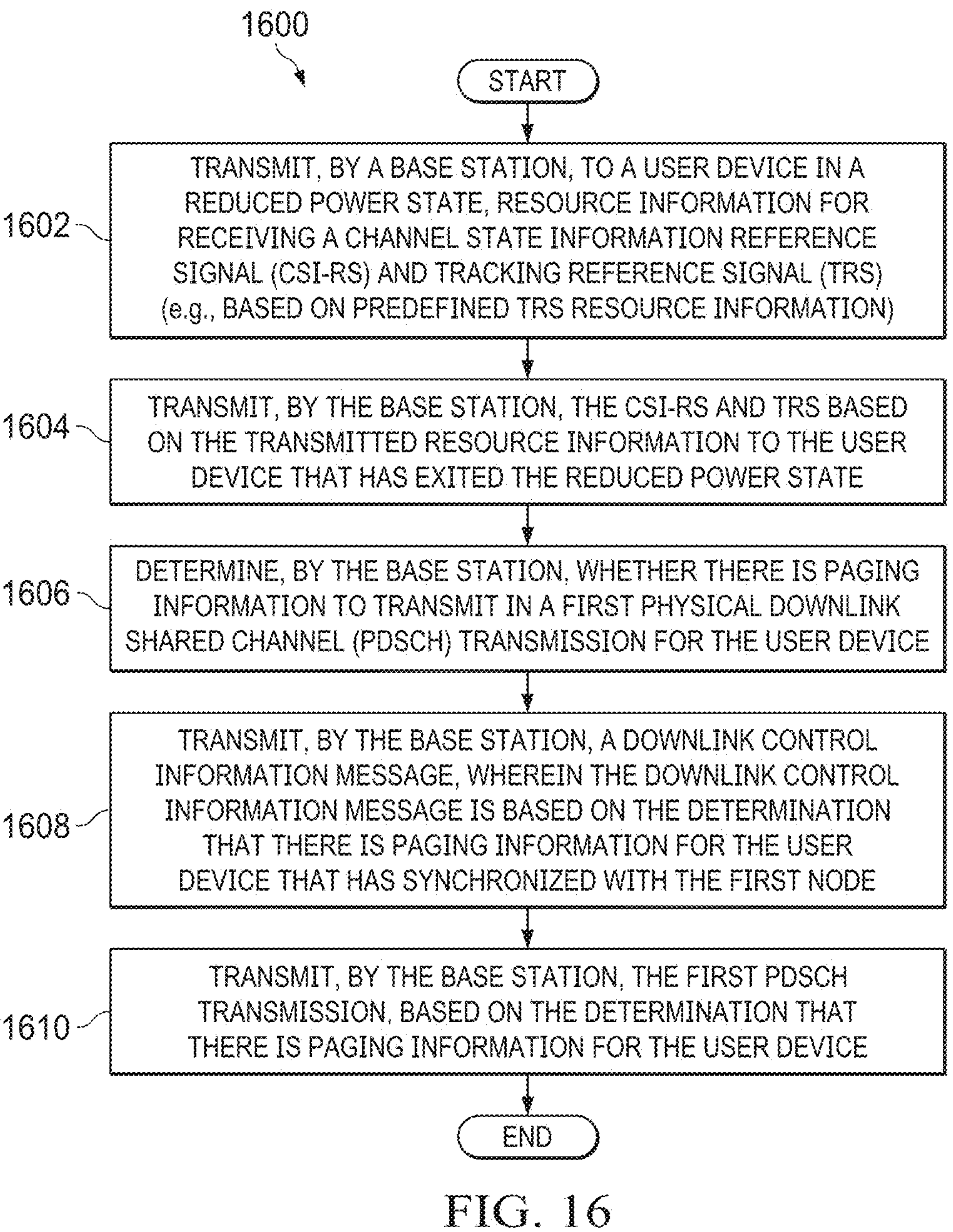
FIG. 16 illustrates an exemplary flow chart for transmitting CSI-RS and TRS resource information from a base station to a UE in a reduced power state, such as the RRC_IDLE or RRC_INACTIVE modes, according to some aspects.

Turning now to FIG. 16, an exemplary flow chart 1600 for transmitting CSI-RS and TRS resource information from a base station to a UE in a reduced power state, such as the RRC_IDLE or RRC_INACTIVE modes is illustrated, according to some aspects. First, at Step 1602, the method may transmit by a base station (e.g., a gNB), to a user device (e.g., a 5G/NR UE) in a reduced power state, resource information for receiving a channel state information reference signal (CSI-RS) and tracking reference signal (TRS) (e.g., based on predefined TRS resource information). Next, at Step 1604, the method may transmit the CSI-RS and TRS using the base station, based on the transmitted resource information, to the user device that has exited the reduced power state. Next, at Step 1606, the base station may determine whether there is paging information to transmit in a first physical downlink shared channel (PDSCH) transmission for the user device. Next, at Step 1608, the base station may transmit a downlink control information message, wherein the downlink control information message is based on the determination that there is paging information for the user device that has synchronized with the base station. Finally, at Step 1610, the base station may transmit the first PDSCH transmission based on the determination that there is paging information for the user device.

Figure 17:
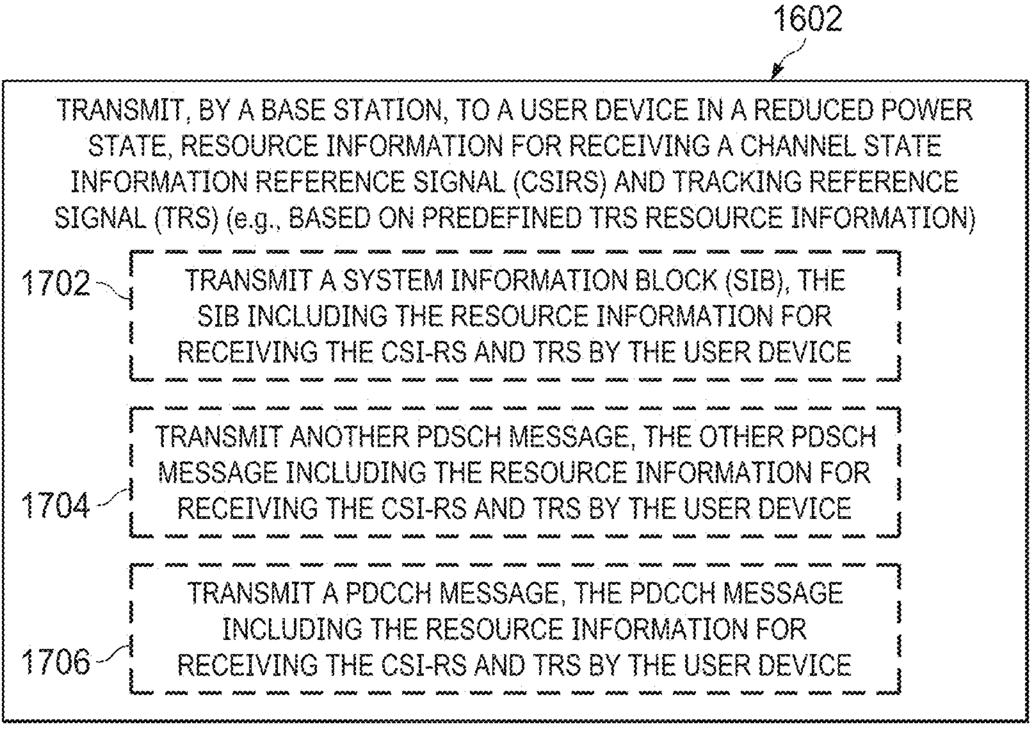
FIG. 17 illustrates an exemplary flow chart for various ways for a base station to transmit CSI-RS and TRS resource information to a UE in a reduced power state, such as the RRC_IDLE or RRC_INACTIVE modes, according to some aspects.

Turning now to FIG. 17, an exemplary flow chart for various ways for a base station to transmit the CSI-RS and TRS resource information of Step 1602 to a UE in a reduced power state, such as the RRC_IDLE or RRC_INACTIVE modes is illustrated, according to some aspects. At block 1702, an option is presented for a base station to transmit a SIB, the SIB including the resource information for receiving the CSI-RS and TRS by the user device. At block 1704, another option is presented for a base station to transmit another PDSCH message (e.g., a PDSCH message transmitted prior to the PDSCH message referenced in Step 1606), the other PDSCH message including the resource information for receiving the CSI-RS and TRS by the user device. At block 1706, yet another option is presented for a base station to transmit a PDCCH message, the PDCCH message including the resource information for receiving the CSI-RS and TRS by the user device. As may be understood, one or more of the various options described with reference to FIG. 17 may be used in a given wireless communication system at different times and/or according to different settings.

EXAMPLES

In the following sections, further examples are provided.

According to example 1, a method for paging in a wireless system is disclosed, comprising: receiving, by a user device in a reduced power state, resource information for receiving a channel state information reference signal (CSI-RS) and tracking reference signal (TRS); exiting, by the user device, the reduced power state to receive the CSI-RS and TRS, based on the resource information; synchronizing, by the user device, with a base station, based on the received CSI-RS and TRS, to receive a downlink control information message; receiving, by the user device, paging information in a first physical downlink shared channel (PDSCH) transmission based on the received downlink control information message; determining, by the user device, whether there is paging information in the first PDSCH transmission for the user device; starting, by the user device, a Random Access Channel (RACH) procedure to make a Radio Resource Control (RRC) connection to the base station, based on a determination that there is paging information for the user device; and returning the user device to the reduced power state, based on a determination that there is not paging information for the user device.

Example 2 comprises the subject matter of example 1, wherein receiving the resource information for receiving the CSI-RS and TRS comprises: receiving, in the reduced power state, a system information block (SIB) transmitted by the base station, the SIB including the resource information for receiving the CSI-RS and TRS for a set of two or more user devices.

Example 3 comprises the subject matter of example 2, further comprising: receiving, by the user device, the SIB via a periodic transmission.

Example 4 comprises the subject matter of example 2, further comprising transmitting, by the user device, a request for the SIB.

Example 5 comprises the subject matter of example 4, wherein transmitting the request for the SIB comprises transmitting a RACH preamble including the request, and wherein the received CSI-RS and TRS is based on the request.

Example 6 comprises the subject matter of examples 1 or 2, wherein the resource information for receiving the CSI-RS and TRS is predefined.

Example 7 comprises the subject matter of example 6, wherein the resource information for receiving the CSI-RS and TRS is predefined based on one or more sets of configuration information.

Example 8 comprises the subject matter of example 1, wherein receiving the resource information for receiving the CSI-RS and TRS further comprises: receiving a second PDSCH message transmitted by the base station prior to the first PDSCH message, the second PDSCH message including the resource information for receiving the CSI-RS and TRS.

Example 9 comprises the subject matter of example 1, wherein receiving the resource information for receiving the CSI-RS and TRS further comprises: receiving a physical downlink control channel (PDCCH) message transmitted by the base station, the PDCCH message including the resource information for receiving the CSI-RS and TRS.

Example 10 comprises the subject matter of example 9, wherein the resource information included in the PDCCH message indicates a predefined CSI-RS and TRS pattern.

According to example 11, a wireless device is disclosed comprising: an antenna; a radio operably coupled to the antenna; and a processor operably coupled to the radio; wherein the wireless device is configured to: receive, in a reduced power state, resource information for receiving a channel state information reference signal (CSI-RS) and tracking reference signal (TRS); exit the reduced power state to receive the CSI-RS and TRS, based on the resource information; synchronize with a base station, based on the received CSI-RS and TRS, to receive a downlink control information message; receive paging information in a first physical downlink shared channel (PDSCH) transmission based on the received downlink control information message; determine whether there is paging information in the first PDSCH transmission for the wireless device; start a Random Access Channel (RACH) procedure to make a Radio Resource Control (RRC) connection to the base station, based on a determination that there is paging information for the wireless device; and return to the reduced power state, based on a determination that there is not paging information for the wireless device.

Example 12 comprises the subject matter of example 11, wherein receiving the resource information for receiving the CSI-RS and TRS comprises: receiving, in the reduced power state, a system information block (SIB) transmitted by the base station, the SIB including the resource information for receiving the CSI-RS and TRS for a set of two or more user devices.

Example 13 comprises the subject matter of example 12, wherein the wireless device is further configured to: receive the SIB via a periodic transmission.

Example 14 comprises the subject matter of example 12, wherein the wireless device is further configured to transmit a request for the SIB.

Example 15 comprises the subject matter of example 14, wherein transmitting the request for the SIB comprises transmitting a RACH preamble including the request, and wherein the received CSI-RS and TRS is based on the request.

Example 16 comprises the subject matter of examples 11 or 12, wherein the resource information for receiving the CSI-RS and TRS is predefined.

Example 17 comprises the subject matter of example 16, wherein the resource information for receiving the CSI-RS and TRS is predefined based on one or more sets of configuration information.

Example 18 comprises the subject matter of example 11, wherein receiving the resource information for receiving the CSI-RS and TRS further comprises: receiving a second PDSCH message transmitted by the base station prior to the first PDSCH message, the second PDSCH message including the resource information for receiving the CSI-RS and TRS.

Example 19 comprises the subject matter of example 11, wherein receiving the resource information for receiving the CSI-RS and TRS further comprises: receiving a physical downlink control channel (PDCCH) message transmitted by the base station, the PDCCH message including the resource information for receiving the CSI-RS and TRS.

Example 20 comprises the subject matter of example 19, wherein the resource information included in the PDCCH message indicates a predefined CSI-RS and TRS pattern.

According to Example 21, an integrated circuit is disclosed, comprising circuitry configured to: cause a wireless device to receive, in a reduced power state, resource information for receiving a channel state information reference signal (CSI-RS) and tracking reference signal (TRS); cause the wireless device to exit the reduced power state to receive the CSI-RS and TRS, based on the resource information; cause the wireless device to synchronize with a base station, based on the received CSI-RS and TRS, to receive a downlink control information message; cause the wireless device to receive paging information in a first physical downlink shared channel (PDSCH) transmission based on the received downlink control information message; determine whether there is paging information in the first PDSCH transmission for the wireless device; cause the wireless device to start a Random Access Channel (RACH) procedure to make a Radio Resource Control (RRC) connection to the base station, based on a determination that there is paging information for the wireless device; and cause the wireless device to return to the reduced power state, based on a determination that there is not paging information for the wireless device.

Example 22 comprises the subject matter of example 21, wherein causing the wireless device to receive the resource information for receiving the CSI-RS and TRS comprises: causing the wireless device in the reduced power state to receive a system information block (SIB) transmitted by the base station, the SIB including the resource information for receiving the CSI-RS and TRS for a set of two or more user devices.

Example 23 comprises the subject matter of example 22, wherein the circuitry is further configured to cause the wireless device to: receive the SIB via a periodic transmission.

Example 24 comprises the subject matter of example 22, wherein the circuitry is further configured to cause the wireless device to transmit a request for the SIB.

Example 25 comprises the subject matter of example 24, wherein transmitting the request for the SIB comprises transmitting, from the wireless device, a RACH preamble including the request, and wherein the received CSI-RS and TRS is based on the request.

Example 26 comprises the subject matter of examples 21 or 22, wherein the resource information for receiving the CSI-RS and TRS is predefined.

Example 27 comprises the subject matter of example 26, wherein the resource information for receiving the CSI-RS and TRS is predefined based on one or more sets of configuration information.

Example 28 comprises the subject matter of example 21, wherein causing the wireless device to receive the resource information for receiving the CSI-RS and TRS further comprises: causing the wireless device to receive a second PDSCH message transmitted by the base station prior to the first PDSCH message, the second PDSCH message including the resource information for receiving the CSI-RS and TRS.

Example 29 comprises the subject matter of example 21, wherein causing the wireless device to receive the resource information for receiving the CSI-RS and TRS further comprises: causing the wireless device to receive a physical downlink control channel (PDCCH) message transmitted by the base station, the PDCCH message including the resource information for receiving the CSI-RS and TRS.

Example 30 comprises the subject matter of example 29, wherein the resource information included in the PDCCH message indicates a predefined CSI-RS and TRS pattern.

According to example 31, a method for paging in a wireless system is disclosed, comprising: transmitting, by a base station, to a user device in a reduced power state, resource information for receiving a channel state information reference signal (CSI-RS) and tracking reference signal (TRS); transmitting, by the base station, the CSI-RS and TRS based on the transmitted resource information to the user device, wherein the user device has exited the reduced power state; determining, by the base station, whether there is paging information to transmit in a first physical downlink shared channel (PDSCH) transmission for the user device; transmitting, by the base station, a downlink control information message, wherein the downlink control information message is based on the determination that there is paging information for the user device, and wherein the user device has synchronized with the base station; and transmitting, by the base station, the first PDSCH transmission, based on the determination that there is paging information for the user device.

Example 32 comprises the subject matter of example 31, wherein transmitting, by the base station, the resource information for receiving the CSI-RS and TRS comprises: transmitting, by the base station, a system information block (SIB) to the user device, the SIB including the resource information for receiving the CSI-RS and TRS for a set of two or more user devices.

Example 33 comprises the subject matter of example 32, wherein the SIB is transmitted periodically.

Example 34 comprises the subject matter of example 32, further comprising receiving, at the base station, a request from the user device for transmission of the SIB.

Example 35 comprises the subject matter of example 34, wherein receiving the request for the transmission of the SIB comprises receiving, by the base station, a random access channel (RACH) preamble including the request, and wherein the received CSI-RS and TRS that is transmitted is based on the request.

Example 36 comprises the subject matter of examples 31 or 32, wherein the resource information for receiving the CSI-RS and TRS is predefined.

Example 37 comprises the subject matter of example 36, wherein the resource information for receiving the CSI-RS and TRS is predefined based on one or more sets of configuration information.

Example 38 comprises the subject matter of example 31, wherein transmitting, by the base station, the resource information for receiving the CSI-RS and TRS further comprises: transmitting, by the base station, a second PDSCH message to the user device prior to the first PDSCH message, the second PDSCH message including the resource information for receiving the CSI-RS and TRS.

Example 39 comprises the subject matter of example 31, wherein transmitting, by the base station, the resource information for receiving the CSI-RS and TRS further comprises: transmitting, by the base station, a physical downlink control channel (PDCCH) message to the user device, the PDCCH message including the resource information for receiving the CSI-RS and TRS.

Example 40 comprises the subject matter of example 39, wherein the resource information included in the PDCCH message indicates a predefined CSI-RS and TRS pattern.

According to example 41, an apparatus is disclosed, comprising: a processor configured to: transmit, to a user device in a reduced power state, resource information for receiving a channel state information reference signal (CSI-RS) and tracking reference signal (TRS); transmit the CSI-RS and TRS based on the transmitted resource information to the user device, wherein the user device has exited the reduced power state; determine whether there is paging information to transmit in a first physical downlink shared channel (PDSCH) transmission for the user device; transmit a downlink control information message, wherein the downlink control information message is based on the determination that there is paging information for the user device, and wherein the user device has synchronized with the apparatus; and transmit the first PDSCH transmission, based on the determination that there is paging information for the user device.

Example 42 comprises the subject matter of example 41, wherein transmitting the resource information for receiving the CSI-RS and TRS comprises: transmitting, by the apparatus, a system information block (SIB) to the user device, the SIB including the resource information for receiving the CSI-RS and TRS for a set of two or more user devices.

Example 42 comprises the subject matter of example 42, wherein the SIB is transmitted periodically.

Example 44 comprises the subject matter of example 42, wherein the processor is further configured to receive, at the apparatus, a request from the user device for transmission of the SIB.

Example 45 comprises the subject matter of example 44, wherein receiving the request for the transmission of the SIB comprises receiving a random access channel (RACH) preamble including the request, and wherein the received CSI-RS and TRS that is transmitted is based on the request.

Example 46 comprises the subject matter of examples 41 or 42, wherein the resource information for receiving the CSI-RS and TRS is predefined.

Example 47 comprises the subject matter of example 46, wherein the resource information for receiving the CSI-RS and TRS is predefined based on one or more sets of configuration information.

Example 48 comprises the subject matter of example 41, wherein transmitting the resource information for receiving the CSI-RS and TRS further comprises: transmitting, by the apparatus, a second PDSCH message to the user device prior to the first PDSCH message, the second PDSCH message including the resource information for receiving the CSI-RS and TRS.

Example 49 comprises the subject matter of example 41, wherein transmitting the resource information for receiving the CSI-RS and TRS further comprises: transmitting, by the apparatus, a physical downlink control channel (PDCCH) message to the user device, the PDCCH message including the resource information for receiving the CSI-RS and TRS.

Example 50 comprises the subject matter of example 49, wherein the resource information included in the PDCCH message indicates a predefined CSI-RS and TRS pattern.

According to Example 51, an integrated circuit is disclosed, comprising circuitry configured to: cause a base station to transmit, to a user device in a reduced power state, resource information for receiving a channel state information reference signal (CSI-RS) and tracking reference signal (TRS); cause the base station to transmit the CSI-RS and TRS based on the transmitted resource information to the user device, wherein the user device has exited the reduced power state; determine whether there is paging information to transmit in a first physical downlink shared channel (PDSCH) transmission for the user device; cause the base station to transmit a downlink control information message, wherein the downlink control information message is based on the determination that there is paging information for the user device, and wherein the user device has synchronized with the base station; and cause the base station to transmit the first PDSCH transmission, based on the determination that there is paging information for the user device.

Example 52 comprises the subject matter of example 51, wherein causing the base station to transmit the resource information for receiving the CSI-RS and TRS comprises: causing the base station to transmit a system information block (SIB) to the user device, the SIB including the resource information for receiving the CSI-RS and TRS for a set of two or more user devices.

Example 53 comprises the subject matter of example 52, wherein the SIB is transmitted periodically.

Example 54 comprises the subject matter of example 52, wherein the circuitry is further configured to cause the base station to receive a request from the user device for transmission of the SIB.

Example 55 comprises the subject matter of example 54, wherein receiving the request for the SIB comprises receiving a random access channel (RACH) preamble including the request, and wherein the received CSI-RS and TRS that is transmitted is based on the request.

Example 56 comprises the subject matter of examples 51 or 52, wherein the resource information for receiving the CSI-RS and TRS is predefined.

Example 57 comprises the subject matter of example 56, wherein the resource information for receiving the CSI-RS and TRS is predefined based on one or more sets of configuration information.

Example 58 comprises the subject matter of example 51, wherein causing the base station to transmit the resource information for receiving the CSI-RS and TRS further comprises: causing the base station to transmit a second PDSCH message to the user device prior to the first PDSCH message, the second PDSCH message including the resource information for receiving the CSI-RS and TRS.

Example 59 comprises the subject matter of example 51, wherein causing the base station to transmit the resource information for receiving the CSI-RS and TRS further comprises: causing the base station to transmit a physical downlink control channel (PDCCH) message to the user device, the PDCCH message including the resource information for receiving the CSI-RS and TRS.

Example 60 comprises the subject matter of example 59, wherein the resource information included in the PDCCH message indicates a predefined CSI-RS and TRS pattern.

Yet another example may include a method, comprising, by a device, performing any or all parts of the preceding examples.

A yet further example may include a non-transitory computer-accessible memory medium comprising program instructions which, when executed at a device, cause the device to implement any or all parts of any of the preceding examples.

A still further example may include a computer program comprising instructions for performing any or all parts of any of the preceding examples.

Another example may include an integrated circuit comprising circuitry configured to perform any or all of any of the preceding examples.

Yet another example may include an apparatus comprising means for performing any or all of the elements of any of the preceding examples.

Still another example may include an apparatus (e.g., a wireless device or wireless station) comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of the methods described herein, or, any combination of the methods described herein, or, any subset of any of the methods described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various methods described herein (or, any combination of the methods described herein, or, any subset of any of the methods described herein, or, any combination of such subsets). The device may be realized in any of various forms.

Although the examples above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing a paging operation by a base station, comprising:

transmitting a dedicated system information block (SIB) comprising resource information for receiving a tracking reference signal (TRS) by two or more user devices in a reduced power state;

transmitting the TRS based on the transmitted resource information to a user device of the two or more user devices, wherein the user device exits the reduced power state to synchronize with the base station;

transmitting a downlink control information message in a physical downlink control channel (PDCCH) to the user device;

transmitting paging information in a physical downlink shared channel (PDSCH) transmission based on the downlink control information message; and establishing a Radio Resource Control (RRC) connection between the user device and the base station based on the paging information.

2. The method of claim 1, wherein the dedicated SIB is transmitted periodically.

3. The method of claim 2, further comprising: transmitting an SIB comprising the periodicity of the dedicated SIB.

4. The method of claim 1, further comprising: receiving, at the base station, a request from the user device for transmission of the dedicated SIB.

5. The method of claim 1, wherein the resource information for receiving the TRS is predefined based on one or more sets of configuration information.

6. The base station of claim 5, wherein the dedicated SIB is transmitted periodically.

7. The base station of claim 6, wherein the base station is further configured to: transmit an SIB comprising the periodicity of the dedicated SIB.

8. The base station of claim 7, wherein the resource information for receiving the CSI-RS and TRS is predefined based on one or more sets of configuration information.

9. The base station of claim 5, wherein the processor is further configured to receive a request from the user device for transmission of the dedicated SIB.

10. The base station of claim 5, wherein the resource information for receiving the TRS is predefined.

11. The integrated circuit of claim 10, wherein the dedicated SIB is transmitted periodically.

12. The integrated circuit of claim 11, wherein the integrated circuit further causes the radio to transmit an SIB comprising the periodicity of the dedicated SIB.

13. The integrated circuit of claim 11, wherein the resource information for receiving the CSI-RS and TRS is predefined based on one or more sets of configuration information.

14. The integrated circuit of claim 10, wherein the radio is further configured to receive a request from the user device for transmission of the dedicated SIB.

15. The integrated circuit of claim 10, wherein the resource information for receiving the TRS is predefined.

16. A base station comprising:

one or more antenna panels;

a radio operably coupled to the one or more antenna panels; and a processor operably coupled to the radio;

wherein the base station is configured to:

transmit a dedicated system information block (SIB) comprising resource information for receiving a tracking reference signal (TRS) to two or more user devices in a reduced power state;

transmit the TRS based on the transmitted resource information to a user device of the two or more user devices, wherein the user device exits the reduced power state to synchronize with the base station;

transmit a downlink control information message in a physical downlink control channel (PDCCH) to the user device, wherein the user device is synchronized with the base station based on the transmitted TRS; and transmit paging information in a physical downlink shared channel (PDSCH) transmission based on the downlink control information message.

17. An integrated circuit, comprising circuitry configured to:

cause a radio operably connected to one or more antenna panels to transmit a dedicated system information block (SIB) comprising resource information for receiving a tracking reference signal (TRS) to two or more user devices in a reduced power state;

cause the radio to transmit the TRS based on the transmitted resource information to a user device of the two or more user devices, wherein the user device exits the reduced power state to synchronize with the base station;

cause the radio to transmit a downlink control information message in a physical downlink control channel (PDCCH) to the user device, wherein the user device is synchronized with a base station based on the transmitted TRS;

cause the radio to transmit paging information in a physical downlink shared channel (PDSCH) transmission based on the downlink control information message; and cause the radio to establish a Radio Resource Control (RRC) connection to the user device.

* * * * *